US010927661B2

(12) United States Patent
Jaaskelainen et al.

(10) Patent No.: US 10,927,661 B2
(45) Date of Patent: Feb. 23, 2021

(54) USING ELECTRO ACOUSTIC TECHNOLOGY TO DETERMINE ANNULUS PRESSURE

(71) Applicant: Halliburton Energy Services, Inc., Houston, TX (US)

(72) Inventors: Mikko Jaaskelainen, Katy, TX (US); Jason Edward Therrien, Cypress, TX (US); Seldon David Benjamin, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 216 days.

(21) Appl. No.: 15/767,038

(22) PCT Filed: Dec. 16, 2015

(86) PCT No.: PCT/US2015/065956
§ 371 (c)(1),
(2) Date: Apr. 9, 2018

(87) PCT Pub. No.: WO2017/105423
PCT Pub. Date: Jun. 22, 2017

(65) Prior Publication Data
US 2018/0291726 A1    Oct. 11, 2018

(51) Int. Cl.
*E21B 47/06* (2012.01)
*E21B 47/135* (2012.01)
*E21B 47/14* (2006.01)
*G01V 1/20* (2006.01)
*G01V 1/52* (2006.01)

(52) U.S. Cl.
CPC ............ *E21B 47/06* (2013.01); *E21B 47/135* (2020.05); *E21B 47/14* (2013.01); *G01V 1/208* (2013.01); *G01V 1/52* (2013.01); *G01V 2001/526* (2013.01)

(58) Field of Classification Search
CPC ....... E21B 47/06; E21B 47/14; E21B 47/4135
See application file for complete search history.

(56) References Cited

U.S. PATENT DOCUMENTS

| 5,022,485 A | 6/1991 | Mitchell | |
|---|---|---|---|
| 6,408,943 B1 * | 6/2002 | Schultz | E21B 47/01 166/285 |

(Continued)

FOREIGN PATENT DOCUMENTS

| WO | WO 2015/020642 A1 * | 2/2015 | ............. E21B 47/12 |
|---|---|---|---|
| WO | 2015051222 A1 | 4/2015 | |
| WO | WO 2015/051222 A1 * | 4/2015 | ............. E21B 47/06 |

OTHER PUBLICATIONS

CA Application Serial No. 2,999,476; Second Office Action; dated Sep. 24, 2019, 3 pages.

(Continued)

*Primary Examiner* — Blake E Michener
(74) *Attorney, Agent, or Firm* — Gilliam IP PLLC

(57) ABSTRACT

A system for continuous determination of annulus pressure in subsurface wells comprises one or more electro acoustic technology sensor assemblies permanently installed in each annulus surrounding a subsurface well; and a fiber optic cable in close proximity to the electro acoustic technology sensor assemblies and in communication with a surface distributed acoustic fiber optic interrogator.

20 Claims, 3 Drawing Sheets

(56) References Cited

U.S. PATENT DOCUMENTS

| | | | |
|---|---|---|---|
| 6,429,784 B1 * | 8/2002 | Beique | E21B 17/14 340/853.2 |
| 6,513,596 B2 | 2/2003 | Wester | |
| 8,961,006 B2 * | 2/2015 | Gleitman | E21B 47/06 374/120 |
| 2001/0020675 A1 * | 9/2001 | Tubel | E21B 47/00 250/227.11 |
| 2003/0020631 A1 * | 1/2003 | Haase | E21B 47/14 340/853.1 |
| 2004/0112595 A1 * | 6/2004 | Bostick, III | E21B 21/08 166/250.01 |
| 2006/0272809 A1 * | 12/2006 | Tubel | E21B 23/03 166/250.01 |
| 2008/0201080 A1 * | 8/2008 | Lovell | G01F 1/684 702/12 |
| 2009/0114386 A1 * | 5/2009 | Hartog | G01V 1/226 166/250.08 |
| 2011/0011576 A1 * | 1/2011 | Cavender | E21B 28/00 166/177.1 |
| 2012/0013893 A1 * | 1/2012 | Maida | E21B 47/123 356/73.1 |
| 2012/0257475 A1 * | 10/2012 | Luscombe | G01V 1/48 367/25 |
| 2014/0036628 A1 * | 2/2014 | Hill | G01V 1/42 367/35 |
| 2014/0097848 A1 * | 4/2014 | LeBlanc | E21B 47/06 324/338 |
| 2014/0139225 A1 * | 5/2014 | Mandviwala | G01V 3/26 324/344 |
| 2014/0191120 A1 | 7/2014 | Donderici et al. | |
| 2015/0167452 A1 | 6/2015 | Godager et al. | |
| 2015/0198031 A1 | 7/2015 | Duncan | |
| 2015/0226054 A1 * | 8/2015 | Schuhrke | E21B 47/09 166/335 |
| 2015/0285065 A1 | 10/2015 | Howell et al. | |
| 2016/0237803 A1 * | 8/2016 | Patel | E21B 47/06 |

OTHER PUBLICATIONS

PCT Application Serial No. PCT/US2015/065956, International Search Report, dated Sep. 12, 2016, 4 pages.

PCT Application Serial No. PCT/US2015/065956, International Written Opinion, dated Sep. 12, 2016, 6 pages.

CA Application Serial No. 2,999,476, Requisition by Examiner, mailed Dec. 27, 2018, 4 pages.

* cited by examiner

USING ELECTRO ACOUSTIC TECHNOLOGY TO DETERMINE ANNULUS PRESSURE

BACKGROUND

This disclosure relates generally to systems and methods for monitoring the annular regions in downhole oil and gas systems.

Fiber optic distributed sensing systems were developed in the 1980s to replace older measurement systems composed of multiple individual sensors.

Fiber optic distributed sensing systems are commonly based on Optical Time-Domain Reflectometry (OTDR) and utilizes techniques originally derived from telecommunications cable testing. Today fiber optic distributed sensing systems provides a cost-effective way of obtaining hundreds, or even thousands, of highly accurate, high-resolution measurements and today find widespread acceptance in industries such as oil and gas, electrical power, and process control.

Oil and Gas wells require the use of several concentric casings to prevent contamination of fresh water, isolate different zones, and a myriad of other reasons. There is an unmet need to provide real time telemetry as to whether or not the annular regions have been compromised.

The systems and methods described herein address this need.

DETAILED DESCRIPTION

Figure 1:
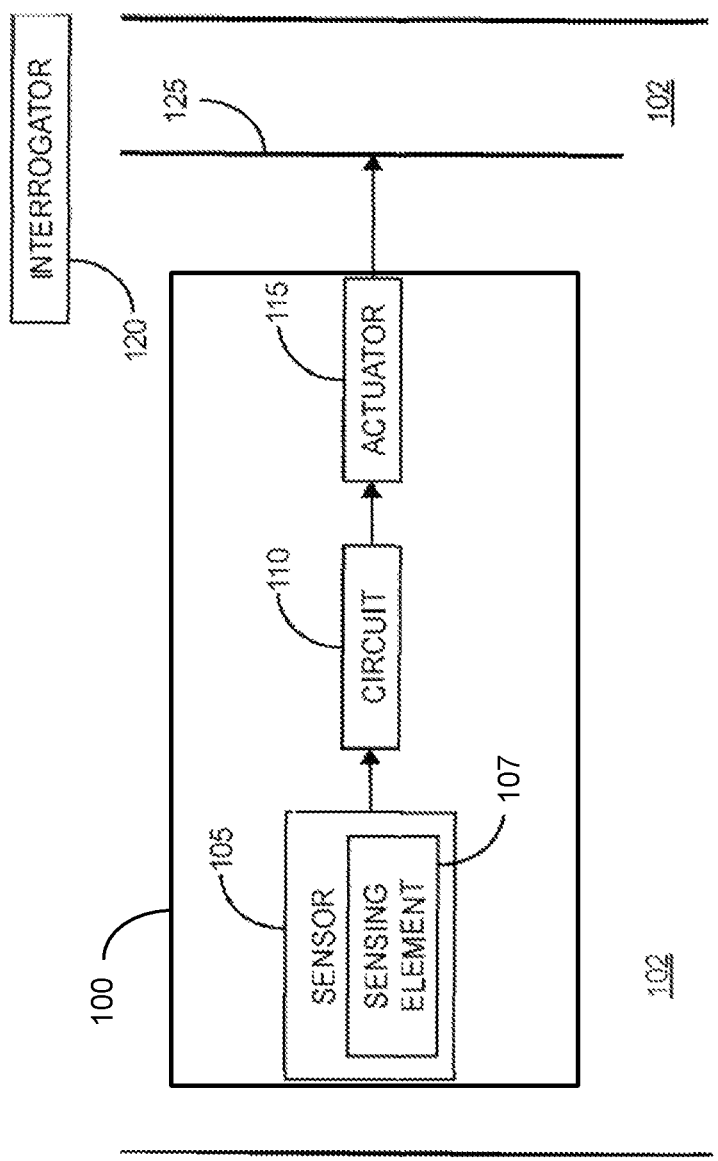
FIG. 1 illustrates the electro acoustic technology concept for parameter monitoring.

In the following detailed description, reference is made to accompanying drawings that illustrate embodiments of the present disclosure. These embodiments are described in sufficient detail to enable a person of ordinary skill in the art to practice the disclosure without undue experimentation. It should be understood, however, that the embodiments and examples described herein are given by way of illustration only, and not by way of limitation. Various substitutions, modifications, additions, and rearrangements may be made without departing from the spirit of the present disclosure. Therefore, the description that follows is not to be taken in a limited sense, and the scope of the present disclosure will be defined only by the final claims.

As described in the background section, oil and gas wells require the use of several concentric casings to prevent contamination of fresh water, isolate different zones, and a myriad of other reasons. There is an unmet need in oil and gas wells that make use of such concentric casings to provide real time telemetry as to whether or not the annular regions have been compromised.

To this end, we propose the use of electro acoustic technology (EAT) that can be deployed with a fiber optic Distributed Acoustic Sensor (DAS) or a Fiber Bragg Grating array interrogated via Time Domain Interferometry (TDI) or Continuous Wave (CW) Interferometry. Using these technologies, pressure in the different annuli can be determined without the need to compromise the integrity of the barriers separating the different annuli.

Electro acoustic technology (EAT) will be described below. The EAT's will be placed in each annulus permanently. Data can be encoded either with Amplitude Modulation at a set frequency, or via Frequency Modulation around a central frequency. In this manner each EAT can be on its own unique channel, and in theory it is possible to have 100's of EATs monitoring simultaneously. The EAT's can either continuously send data, or to save power be programmed to come online at a set interval and send their data. Since the receiver of the emitted signal is fiber optics installed in the well bore, an external probe such as one deployed on a remote operated vehicle (ROV) is not required.

Description of EAT (Electro Acoustic Technology) Sensors

The EAT sensors and EAT sensing technology described in this disclosure is a recently developed technology and has been described in a recently published PCT application: WO2015020642A1.

EAT Sensors represent a new approach to fiber optic sensing in which any number of downhole sensors, electronic or fiber optic based, can be utilized to make the basic parameter measurements, but all of the resulting information is converted at the measurement location into perturbations or a strain applied to an optical fiber that is connected to an interrogator that may be located at the surface of a downhole well. The interrogator may routinely fire optical signal pulses downhole into the optical fiber. As the pulses travel down the optical fiber back scattered light is generated and is received by the interrogator.

The perturbations or strains introduced to the optical fiber at the location of the various EAT sensors can alter the back propagation of light and those effected light propagations can then provide data with respect to the signal that generated the perturbations.

The EAT sensor system can be best understood by reference to FIG. 1, which is an example embodiment of an EAT sensor system. A system 100 can include a sensor 105, a circuit 110 coupled to the sensor 105, and an actuator 115 coupled to the circuit 110. The sensor 105 is operable to provide a measurement corresponding to a parameter at a location in a region 102. The sensor 105 can be realized in a number of different ways depending on the parameter to be determined by the measurement using the sensor 105. The parameter can include, but is not limited to, a chemical concentration, a pH, a temperature, a vibration, or a pressure. The sensor 105 has the capability of being disposed at a location in proximity of an optical fiber cable 125. The sensor 105 can be located downhole at a drilling site with an interrogator 120 at the surface of the drilling site. The drilling site may be terrestrial or sea-based. Components of the system 100 may be disposed outside casing in cement or strapped to a production tube in a permanent installation. Components of the system 100 also may be disposed in a coiled tube that can be pushed through into a horizontal area of operation, or a wire line cable that can be tractored into a wellbore using an electrically driven tractor that pulls the wire line cable into the wellbore, or pumped into a wellbore with fluid that push/pulls a cable into the wellbore. The system 100 may be used with other drilling related arrangements. The circuit 110, coupled to the sensor 105, can be structured to be operable to generate a signal correlated to the parameter in response to the measurement by the sensor 105. The circuit 110 may be integrated with the sensor 105. For example, a sensing element 107 may be an integral part of the circuit 110 or directly coupled to a component of the circuit 110. The sensing element 107 may be a diaphragm directly coupled to a component of the circuit 110.

The actuator 115 can be coupled to the circuit 110 to receive the signal generated in response to the measurement by the sensor 105. The signal can be a compensated signal, where a compensated signal is a signal having a characteristic that corresponds to the parameter of interest for which variations in one or more other parameters is substantially corrected or removed, or for which the characteristic is isolated to the parameter of interest. The actuator 115 can be integrated with the circuit 110, integrated with the circuit 110 that is integrated with the sensor 105, or a separate structure coupled to the circuit 110.

The actuator 115 can be structured to be operable to generate a perturbation, based on the signal, to an optical fiber cable 125, that may include one or multiple optical fibers. The actuator 115 can be positioned in proximity to the optical fiber cable 125 at the effective location of the sensor 105. The actuator 115 can be structured to be operable to generate the perturbation to the optical fiber cable 125 with the actuator 115 in contact with the optical fiber cable 125. The actuator 115 can be structured to be operable to generate the perturbation to the optical fiber cable 125 with the actuator 115 a distance from the optical fiber cable 125. The actuator 115 may be realized as a non-contact piezoelectric material, which can provide acoustic pressure to the optical fiber cable 125 rather than transferring vibrations by direct contact.

The optical fiber cable 125 can be perturbed with the optical fiber cable 125 in direct contact with the actuator 115 structured as a vibrator or with the actuator 115 structured having a form of voice coil at a distance away from the optical fiber cable 125. The perturbation of the optical fiber can be provided as a vibration of the optical fiber cable 125 or a strain induced into the optical fiber cable 125. Other perturbations may be applied such that the characteristics of the optical fiber are altered sufficiently to affect propagation of light in the optical fiber cable 125. With the effects on the light propagation related to a signal that generates the perturbation, analysis of the effected light propagation can provide data with respect to the signal that generates the perturbation.

The interrogator 120 can be structured to interrogate the optical fiber cable 125 to analyze signals propagating in the optical fiber cable 125. The interrogator 120 can have the capability to couple to the optical fiber cable 125 to receive an optical signal including the effects from the perturbation of the optical fiber cable 125 and to extract a value of the parameter of the measurement in response to receiving the optical signal from the perturbation. In an embodiment, the received signal may be a backscattered optical signal. The interrogator 120 may be structured, for example, to inject a short pulse into the optical fiber cable 125. An example of a short pulse can include a pulse of 20 nanoseconds long. As the pulse travels down the optical fiber cable 125, backscattered light is generated. Interrogating a location that is one kilometer down the fiber, backscattered light is received after the amount of time it takes to travel one kilometer and then come back one kilometer, which is a round trip time of about ten nanoseconds per meter. The interrogator 120 can include an interferometric arrangement. The interrogator 120 can be structured to measure frequency based on coherent Rayleigh scattering using interferometry, to measure dynamic changes in attenuation, to measure a dynamic shift of Brillouin frequency, or combinations thereof.

The interrogator 120 can be arranged with the optical fiber cable 125 to use an optical signal provided to the interrogator 120 from perturbing the optical fiber cable 125 at a location along the optical fiber cable 125. An arrangement different from using an optical signal backscattered from the perturbation can be utilized. For example, the optical fiber cable 125 can be structured having an arrangement selected from a fiber Bragg grating disposed in the optical fiber in vicinity of the actuator for direct wavelength detection based acoustic sensing, a non-wavelength selective in-line mirror disposed in the optical fiber in vicinity of the actuator, intrinsic Fabry-Perot interferometers as a mode of interrogation from fiber Bragg gratings placed apart in the optical fiber such that each fiber Bragg grating Fabry-Perot cavity is in vicinity of a respective actuator, Fizeau sensors in the optical fiber, a second optical fiber to transmit an optical signal from a perturbation of the optical fiber to a detection unit of the interrogator, or other arrangements to propagate a signal, representative of a measurement, in an optical fiber to an interrogation unit to analyze the signal to extract a value of a parameter that is the subject of the measurement.

The possible advantages from using the above described EAT systems in a variety of configurations may include using a variety of sensors, either electrical or fiber optic based, to measure for example a chemical concentration, a pH, a temperature, or a pressure and using a common optical fiber connected to a surface interrogator to measure perturbation signals from each EAT sensor location distributed along that common optical fiber and analyzing those signals to extract values of the parameters being measured. The approach can significantly reduce manufacturing complexity, reduce very expensive labor intensive production with expensive equipment like splicers and fiber winders, improve reliability, and widen industry acceptance by allowing the use of sensing technologies of choice.

Figure 2:
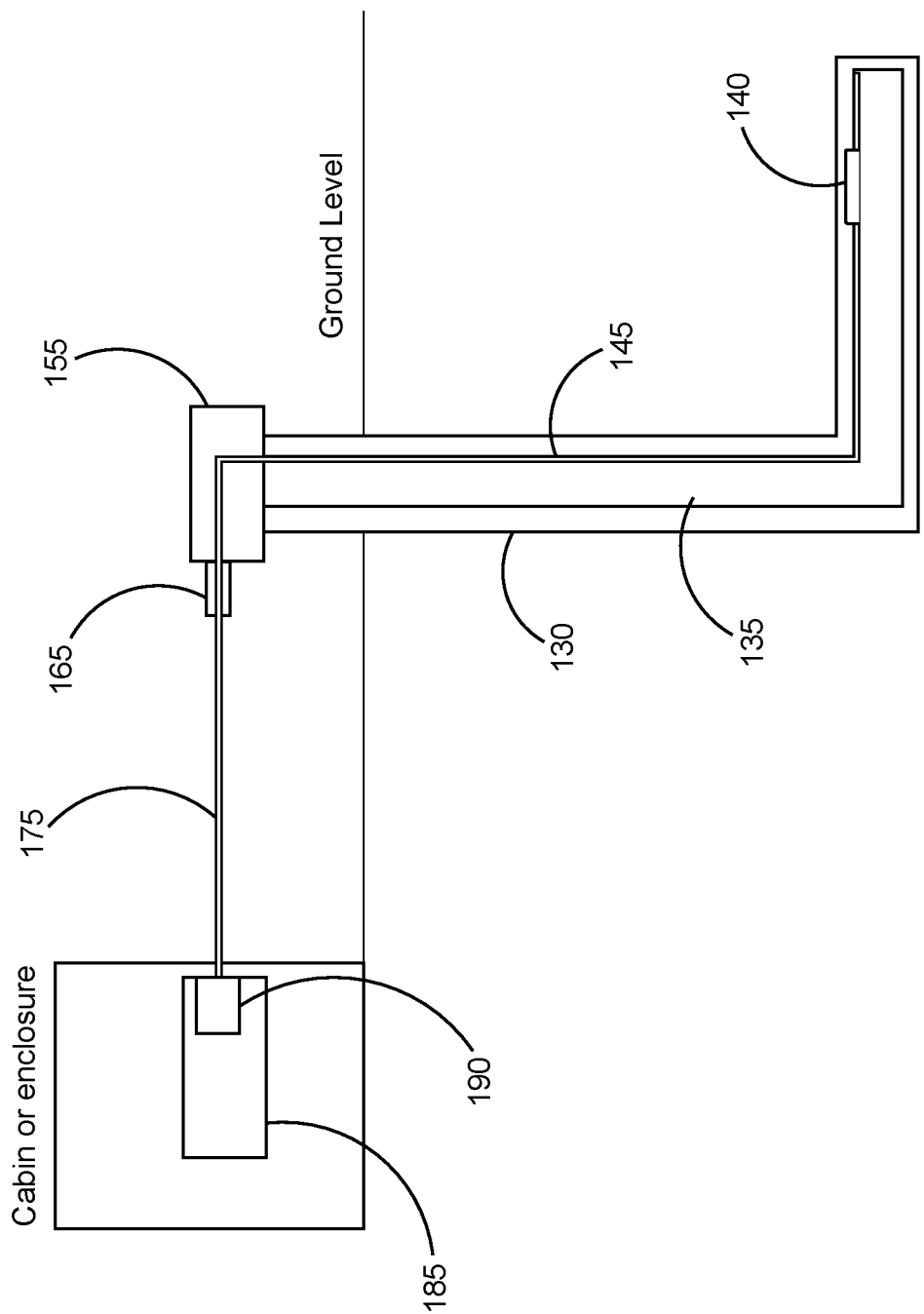
FIG. 2 illustrates a more complete system for utilizing electro acoustic technology in a subsurface well.

FIG. 2 expands on the use of electro acoustic technology (EAT) sensing systems by illustrating a more complete system. A subsurface well 130 is illustrated, in which a production casing 135 is shown extending through the well. In some applications the production casing may be non-metallic. At the far downhole end of the well an electro acoustic technology sensor assembly 140 is shown. In this example it is shown on the outside of the casing. In some applications the EAT sensor assembly could be within the casing. In many applications there could be multiple EAT sensor assemblies and the technology can easily accommodate that. In close proximity to the EAT sensor assembly shown is a fiber optic cable 145 that is deployed all through the well and back to the surface, then through a wellhead 155. The fiber optic cable 145 may be clamped to the EAT sensor assembly 140 to ensure good transmission of signals. The fiber optic cable 145 exits through a wellhead exit 165 and is connected using a surface fiber cable 175 within an outdoor cabin or enclosure to a Distributed Acoustic System (DAS) interrogator 185. The interrogator may then have a laser source 190 that fires interrogation pulses down through the fiber optic cable and receives backscattered light back from the fiber optic cable.

The fiber optic cable 145 may be permanently installed, or in some applications could be attached to some type of movable logging cable such as wireline or slickline cables. It could also be clamped on tubing inside the casing 135 in some applications.

Using EAT to Monitor Annulus Pressures

Figure 3:
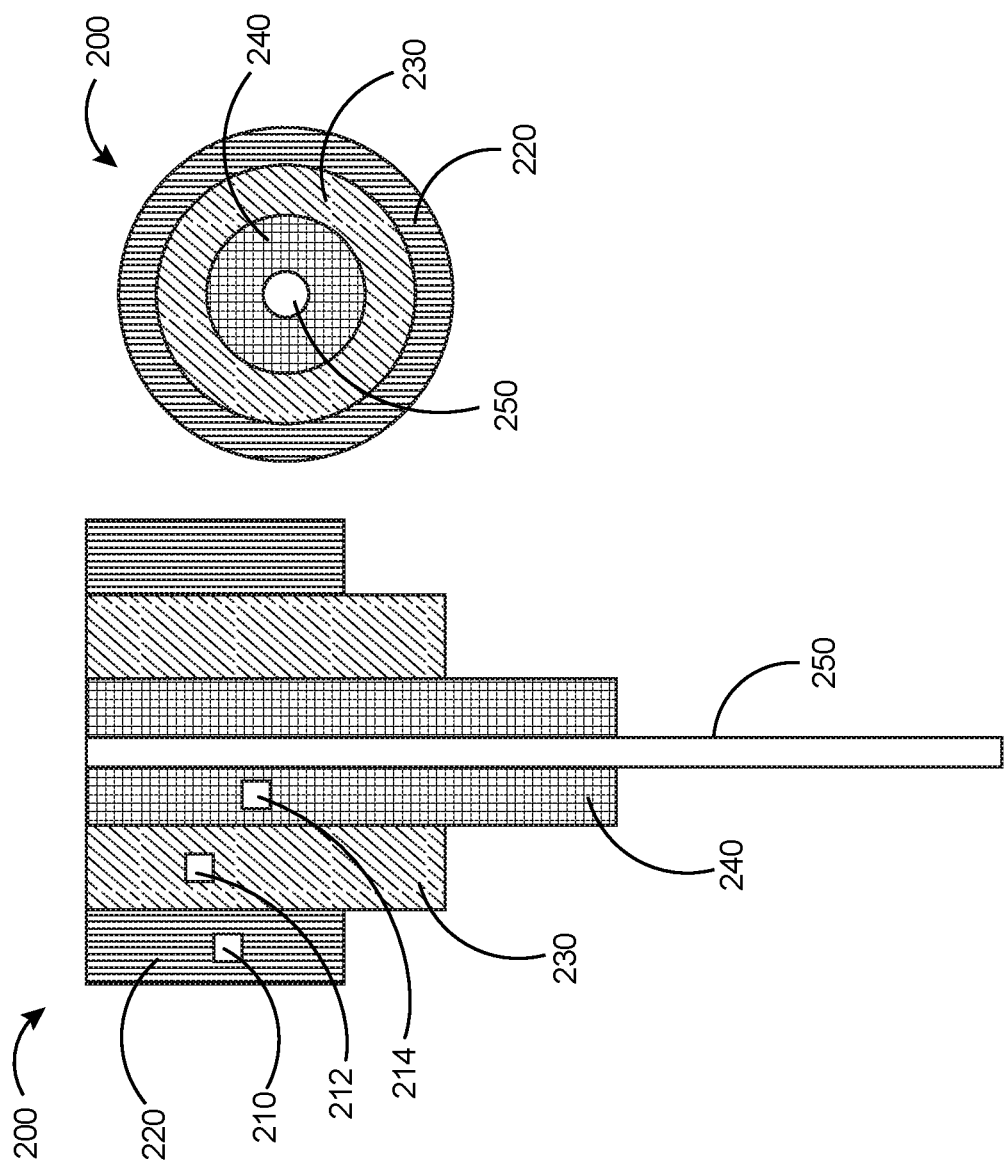
FIG. 3 illustrates the placement of electro acoustic technology (EAT) devices into a well.

FIG. 3, represented by the numeral 200, is an illustration of the placement of multiple EAT's in a well. The casing structure is represented on the left hand side by a side cross section of the casings and on the right hand side by a top view of the same casings. An outside annulus 220, inner annulus 240 and middle annulus 230 is shown surrounding a central casing 250 with EAT sensors 210, 212, and 214 placed in all of them. The fiber optic cable 145 of FIG. 2 (not shown in FIG. 3) may be a single fiber optic cable attached immediately outside the casing or in some cases inside the casing, clamped on tubing inside the casing. It is also feasible in the case that the signal levels are too low to use the interior electro acoustic technology sensor assemblies such as 212 and 214 as signal repeaters to transfer signals from a more distant electro acoustic sensor assembly such as 210 to the fiber optic cable.

As described earlier, the EAT's will be placed in each annulus permanently. Data can be encoded either with Amplitude Modulation at a set frequency, or via Frequency Modulation around a central frequency. In this manner each EAT can be on its own unique channel, and in theory you could have 100's of EATs monitoring simultaneously. The EAT's can either continuously send data, or to save power be programmed to come online at a set interval and send their data. Since the receiver of the emitted signal is fiber optics installed in the well bore, an external probe such as one deployed on an ROV is not required.

The data from the EAT's is transmitted to the surface through a distributed acoustic system through a fiber optic cable as described in the electro acoustic technology discussion.

The use of EAT sensors provides the ability to monitor casing integrity continuously and remotely. And all of the sensors can be read continuously and simultaneously. This can be done without compromising the casing.

Although certain embodiments and their advantages have been described herein in detail, it should be understood that various changes, substitutions and alterations could be made without departing from the coverage as defined by the appended claims. Moreover, the potential applications of the disclosed techniques is not intended to be limited to the particular embodiments of the processes, machines, manufactures, means, methods and steps described herein. As a person of ordinary skill in the art will readily appreciate from this disclosure, other processes, machines, manufactures, means, methods, or steps, presently existing or later to be developed that perform substantially the same function or achieve substantially the same result as the corresponding embodiments described herein may be utilized. Accordingly, the appended claims are intended to include within their scope such processes, machines, manufactures, means, methods or steps.

The invention claimed is:

1. A system for continuous determination of annulus pressure in subsurface wells comprising:
electro acoustic technology sensor assemblies mounted on a plurality of casings to measure annulus pressure corresponding to the plurality of casings of a subsurface well; and
a fiber optic cable in a first of the plurality of casings in communication with a surface distributed acoustic fiber optic interrogator, wherein the electro acoustic technology sensor assemblies are configured to convert, at a location of measurement, the annulus pressure measurements into acoustic perturbations that are applied to the fiber optic cable.

2. The system of claim 1, wherein the fiber optic cable is attached to a surface of one of the casings.

3. The system of claim 1, wherein the fiber optic cable is attached to tubing inside one of the casings.

4. The system of claim 1, wherein the electro acoustic technology sensor assemblies utilize signal repeaters to transfer signals from one electro acoustic technology sensor assembly to a second electro acoustic technology sensor assembly.

5. The system of claim 1, wherein the electro acoustic technology sensor assemblies each comprise an electro acoustic technology sensor, a circuit coupled to the sensor, and an actuator coupled to the circuit.

6. The system of claim 5, wherein the actuator comprises a vibrator to perturb the fiber optic cable.

7. The system of claim 5, wherein the actuator comprises a voice coil at a distance away from the fiber optic cable.

8. The system of claim 1, wherein the surface distributed acoustic fiber optic interrogator is coupled to the fiber optic cable to receive optical signals including effects of the acoustic perturbations on the fiber optic cable.

9. The system of claim 1, wherein the surface distributed acoustic fiber optic interrogator is structured to interrogate the fiber optic cable to analyze signals propagating in the fiber optic cable.

10. The system of claim 1, wherein each of the electro acoustic technology sensor assemblies operates on a unique channel.

11. The system of claim 10, wherein each unique channel corresponds to a set frequency.

12. A method for continuous determination of annulus pressure in subsurface wells comprising:
measuring, with electro acoustic technology sensor assemblies mounted on a plurality of casings of a subsurface well, annulus pressures corresponding to the plurality of casings;
generating at the location of the measuring, with the electro acoustic technology sensor assemblies, acoustic perturbations that interact with a fiber optic cable in a first of the casings; and
interrogating with a surface distributed acoustic fiber optic interrogator to determine the annulus pressure measurements.

13. The method of claim 12, wherein the fiber optic cable is provided on the outside of one of the plurality of casings.

14. The method of claim 12, wherein the fiber optic cable is attached to tubing inside of one of the plurality of casings.

15. The method of claim 12, wherein generating acoustic perturbations that interact with the fiber optic cable further comprises:
determining a control signal based on a first of the annulus pressures measured by a sensor of a first of the electro acoustic technology sensor assemblies; and
transmitting the control signal to an actuator of the first electro acoustic technology sensor assembly.

16. The method of claim 15, wherein the control signal causes the actuator to perturb the fiber optic cable.

17. The method of claim 15, wherein the actuator comprises a non-contact piezoelectric material which generates acoustic pressure in response to the control signal, wherein the acoustic perturbations include the acoustic pressure.

18. The method of claim 12, further comprising each of the electro acoustic technology sensor assemblies encoding a corresponding one or more of the annulus pressures measured by a sensor of the electro acoustic technology sensor assembly using amplitude modulation at a set frequency or frequency modulation around a central frequency, wherein each electro acoustic technology sensor assembly corresponds to a unique set frequency or central frequency.

19. The method of claim 12, wherein interrogating with the surface distributed acoustic fiber optic interrogator to determine the annulus pressure measurements comprises:

firing optical signal pulses downhole into the fiber optic cable;

receiving backscattered light introduced by the acoustic perturbations in the fiber optic cable; and analyzing the backscattered light to extract the annulus pressure measurements.

20. The method of claim 12, further comprising transferring signals from one electro acoustic technology sensor assembly to a second electro acoustic technology sensor assembly using signal repeaters.

* * * * *